Figure 1:
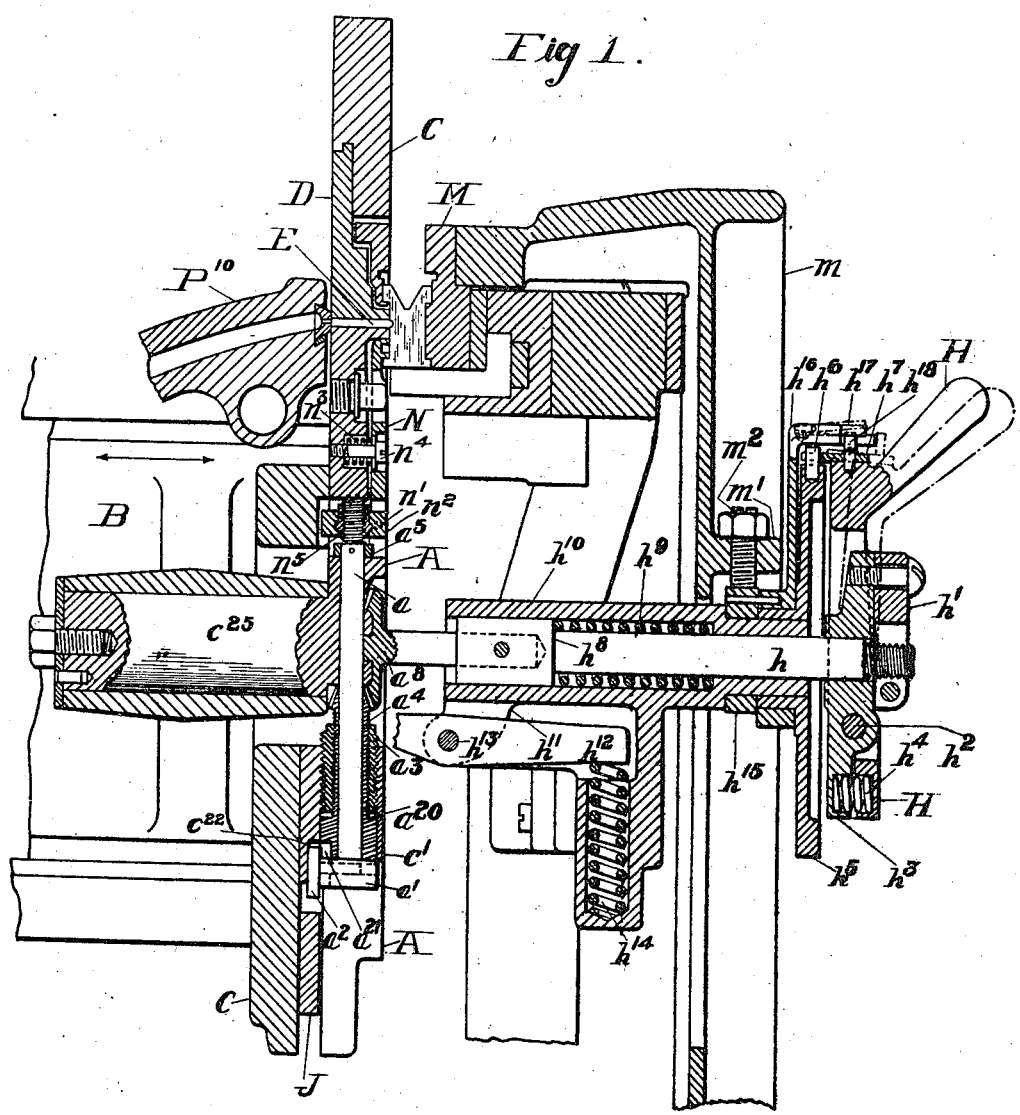

T. S. HOMANS.
LINOTYPE MACHINE.
APPLICATION FILED JAN. 7, 1910.

965,300.

Patented July 26, 1910.
7 SHEETS—SHEET 1.

WITNESSES:

INVENTOR
T. S. Homans
BY
ATTORNEY

T. S. HOMANS.
LINOTYPE MACHINE.
APPLICATION FILED JAN. 7, 1910.
965,300.
Patented July 26, 1910.
7 SHEETS—SHEET 2.
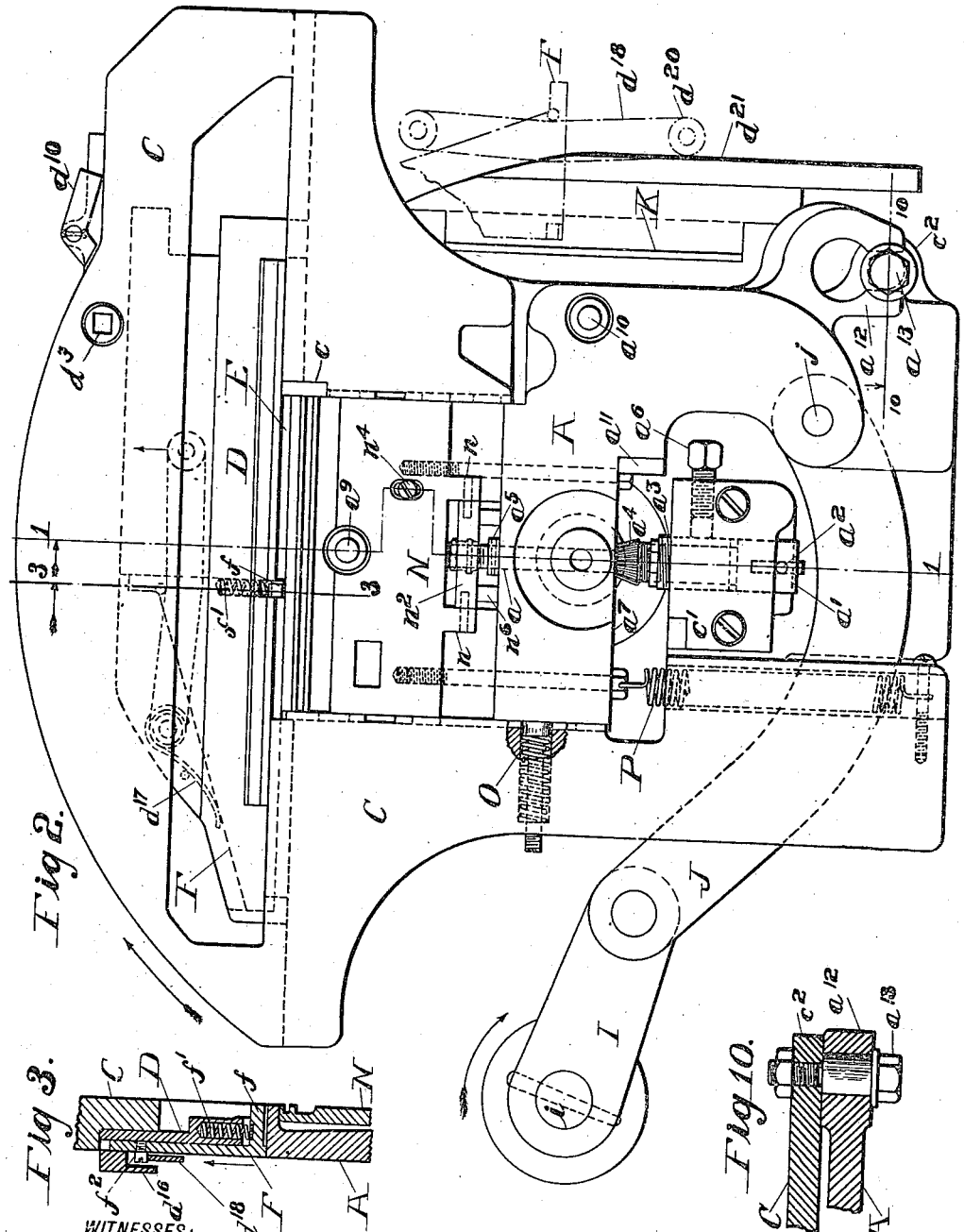

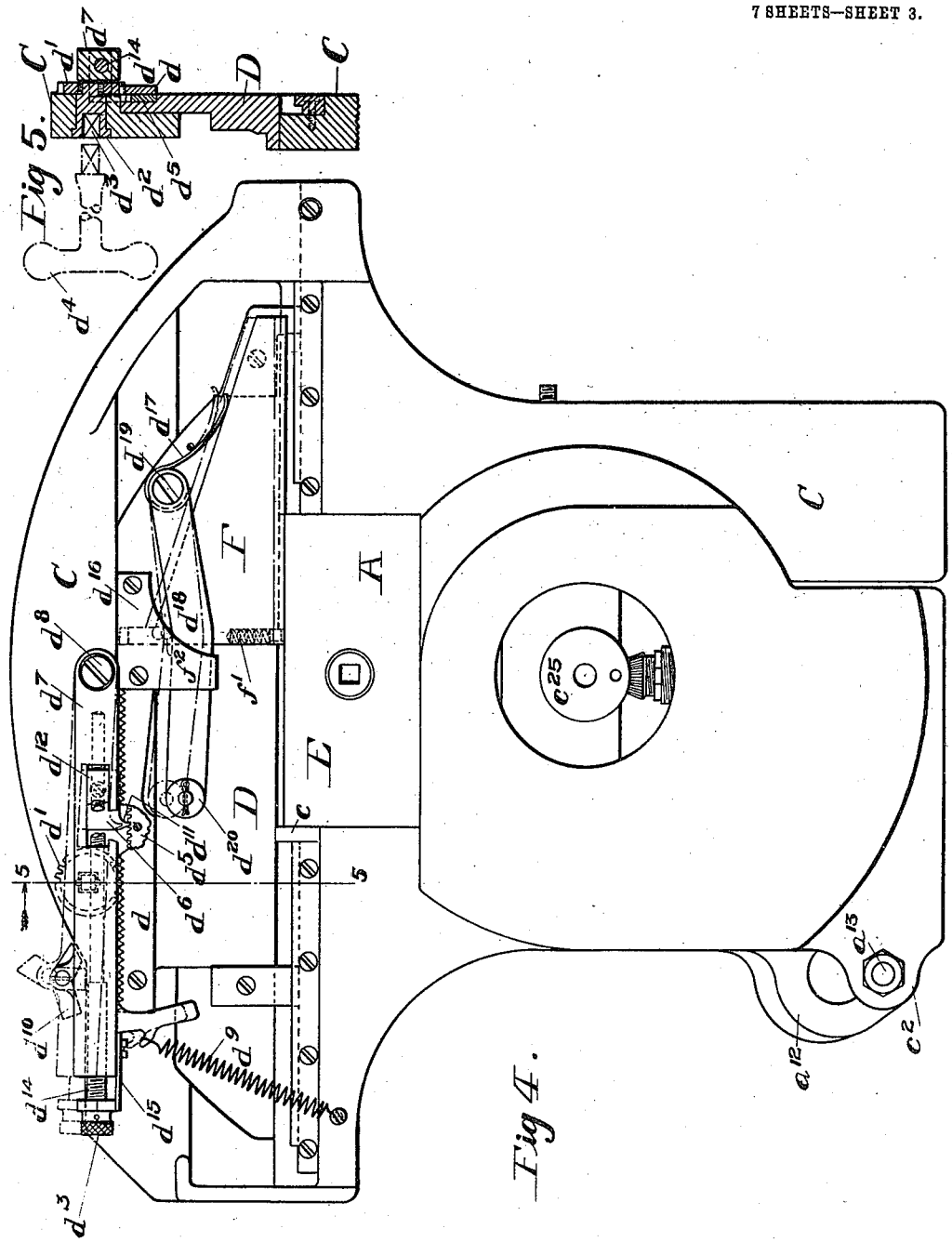

T. S. HOMANS.
LINOTYPE MACHINE.
APPLICATION FILED JAN. 7, 1910.
965,300.
Patented July 26, 1910.
7 SHEETS—SHEET 4.
Fig 4ª.
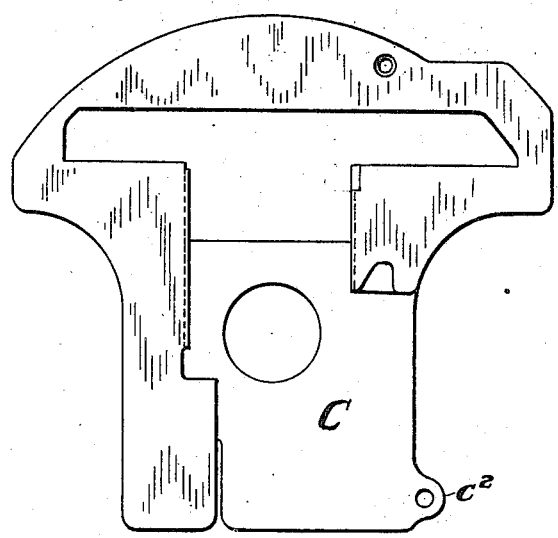
Fig 4ᵇ.
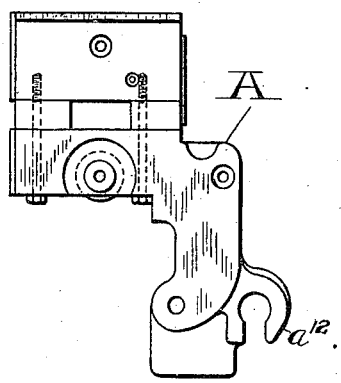
WITNESSES:
G. D. Hartley
Walter Moblard
INVENTOR
T. S. Homans
BY P. T. Dodge
ATTORNEY

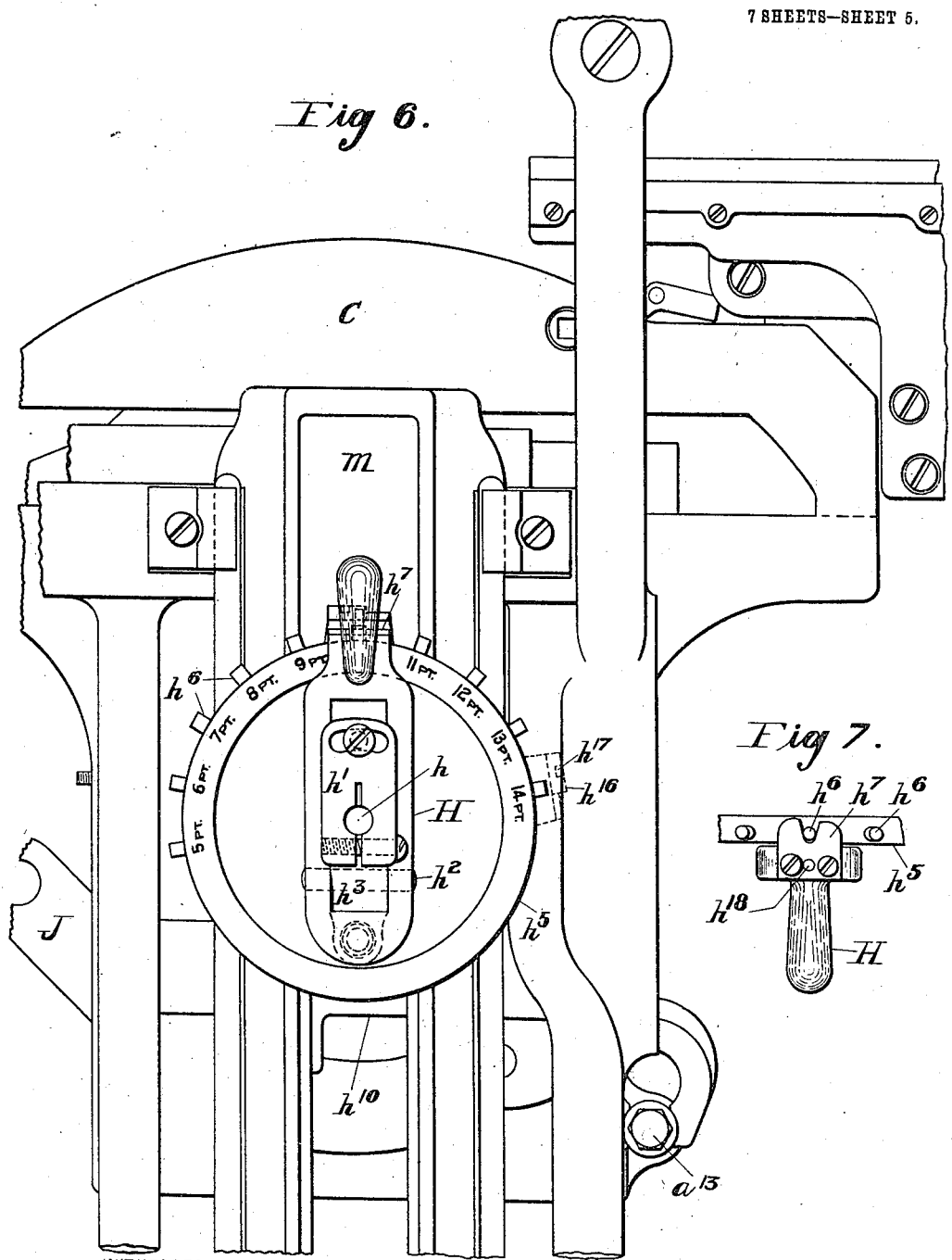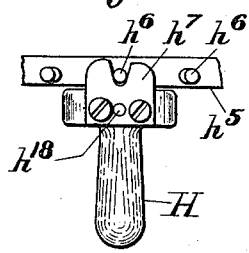

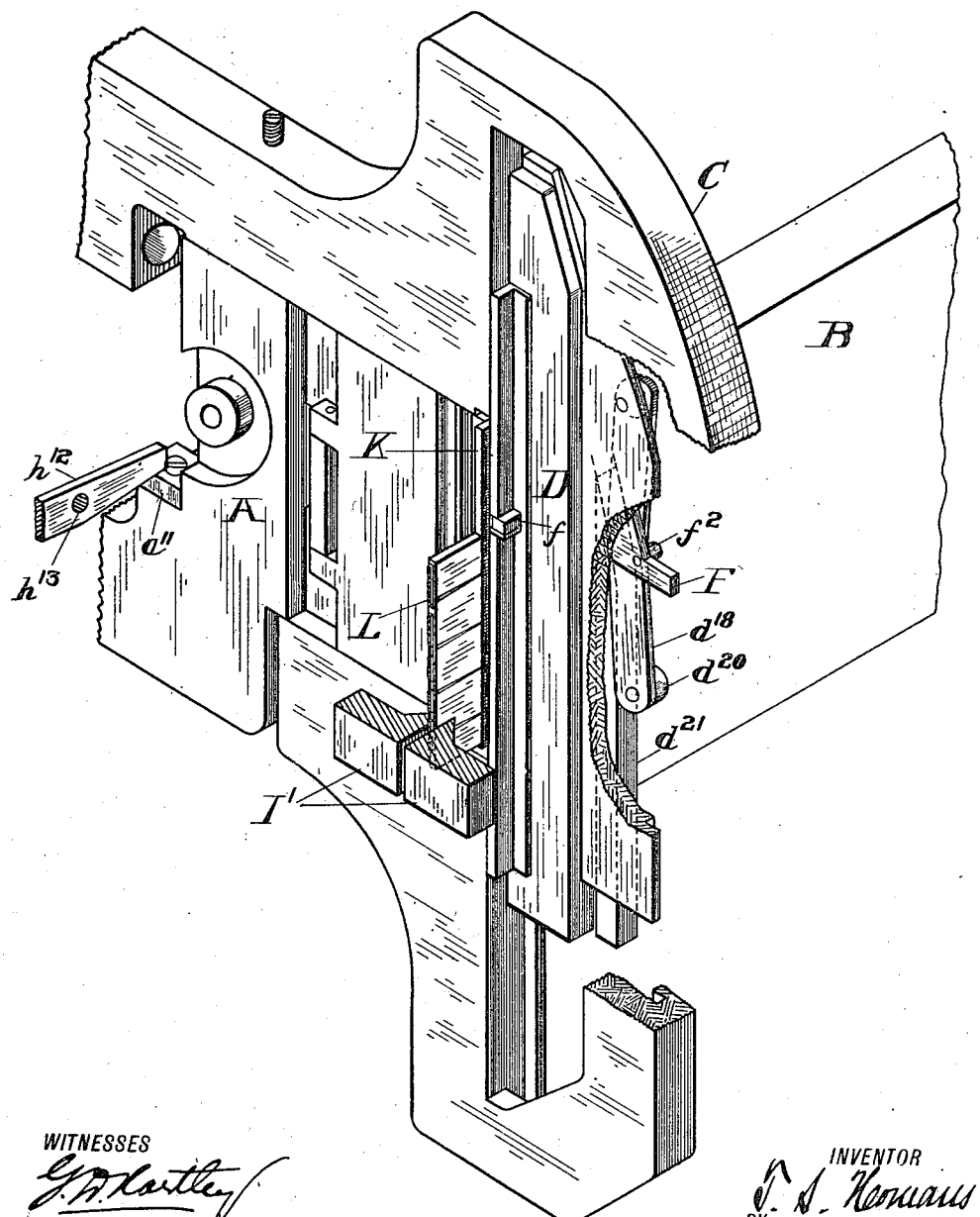

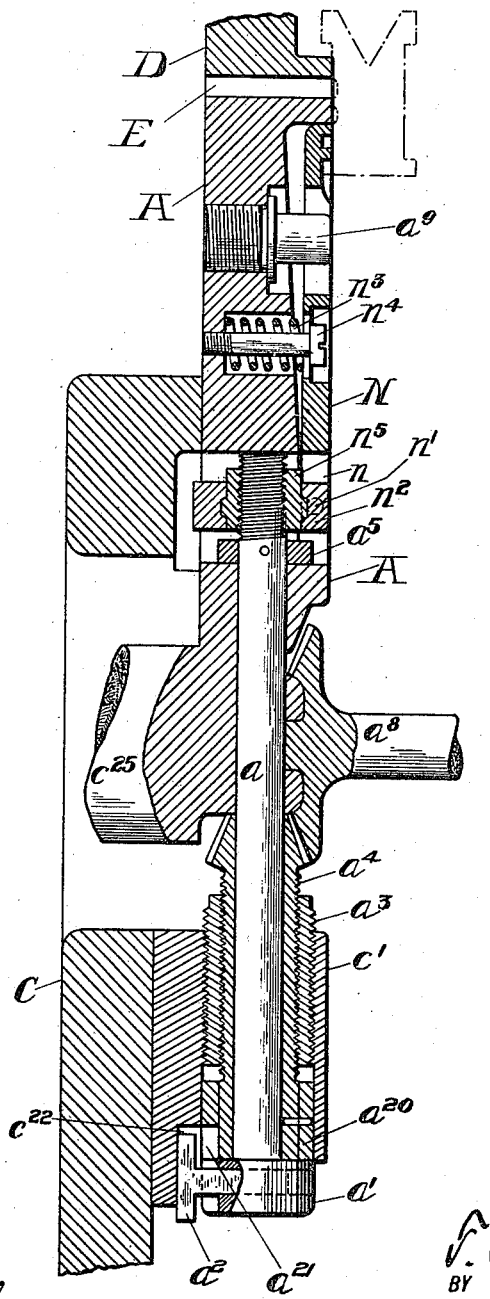

UNITED STATES PATENT OFFICE.

THOMAS SIMMONS HOMANS, OF BROOKLYN, NEW YORK, ASSIGNOR TO MERGENTHALER LINOTYPE COMPANY, A CORPORATION OF NEW YORK.

LINOTYPE-MACHINE.

965,300.  Specification of Letters Patent.  Patented July 26, 1910.

Application filed January 7, 1910. Serial No. 536,816.

*To all whom it may concern:*

Be it known that I, THOMAS SIMMONS HOMANS, a citizen of the United States, residing at Brooklyn, in the county of Kings and State of New York, have invented certain new and useful Improvements in Linotype-Machines, of which the following is a specification, reference being had therein to the accompanying drawing.

In commercial line-casting machines, such as are used at the present time, the type metal slugs or linotypes, each of which bears on one edge the characters to print an entire line, are formed by injecting molten metal into a slotted mold against the front of which a composed line of matrices has been temporarily presented. Such machines are well known in the art and are illustrated in numerous Letters Patent, such for instance, as in Letters Patent of the United States No. 557,000, to O. Mergenthaler.

In practice it is often necessary to provide for frequent change in the length of the slug produced, according to the varying lengths of the lines to be printed, and also to provide for frequent change in the thickness of the slugs, according to the varying sizes of type faces required. Coincident with these changes in the length of the mold slot, it is essential also to provide for similar and corresponding changes in the width of the ejector blades used to expel the slug from the mold after it is cast. It is also necessary at times to vary the position at which the line of matrices, supported in the vertically movable member known as the "first elevator", is presented to the mold slot, so that different sizes of type faces may be cast upon slugs of similar size or thickness, or so that the characters in the line may be cast upon the slug in any desired relation to the edges thereof. For instance, some fonts have long ascending characters, and others long descending characters. Other fonts have long ascending and short descending characters. In one case it may be necessary to move the characters upward on the slug, and in another to move them downward on the slug, in order that an alphabet of a given size may be located on the face of a given slug. Again, in some cases, and for special reasons, a small alphabet is to be located near the upper or near the lower edge of the slug.

With these requirements and objects in view, the aim of my invention is to so construct the mold that it may be quickly adjusted to vary the length or the thickness of the slug to be produced, or both, and this without the removal or insertion of liners or other parts, as is frequently practiced with the molds now in general use, the construction being such also as to permit of the employment in the machine of a single ejector blade of maximum width which ejects slugs of all lengths and thicknesses from the mold slot. I further provide connected means for effecting these functions, whereby the mold members may be quickly and accurately set by the machine operator for the different measures of body and length without having to leave his seat at the keyboard, and without the necessity of opening the vise or front frame of the machine, as is ordinarily customary in existing practice. In order to permit the employment of the single ejector blade previously mentioned, I provide a movable abutment, which normally constitutes one wall of the mold, but which is retracted during the ejecting operation.

I also employ suitable adjusting means whereby the position of the first elevator and of the mold keeper-plate may be varied with reference to the mold slot,—these movements of variation being automatic and synchronous, and when desired following one another in any predetermined progressive series, and the adjusting means for effecting the variations being similarly under the convenient control of the operator. In this connection means are also provided whereby the parts yield to prevent breakage in the event that they have been improperly or carelessly adjusted.

Another feature of construction is the provision of adjusting means whereby the parallelism of the mold walls may be readily and accurately secured.

These and other features will appear from the detailed description that follows.

In some particulars the general construction and arrangement of parts is similar to that presented in my former Letters Patent No. 837,837, and may be regarded as an improvement thereon.

It will also be understood that I do not limit myself to the precise form and details shown and described herein, and that many variations and changes therein will suggest themselves to those skilled in the art without departure from the spirit of my invention; and, generally speaking, I do not desire to limit myself to any specific details or features except in so far as such limitations are specified in the claims.

In the accompanying drawings: Figure 1 is a vertical cross-section through the mold and the adjacent parts of the machine, taken substantially on the line 1—1 of Fig. 2; Fig. 2 is a front elevation thereof, a portion of the ejecting mechanism and its connected parts being shown at the right-hand side thereof; Fig. 3 is a vertical cross-section taken substantially on the line 3—3 in Fig. 2, and showing the spring block in the casting position; Fig. 4 is a rear elevation of the mold; Fig. 4$^a$ is an outline elevation of the mold frame; Fig. 4$^b$ is a similar view of the mold body; Fig. 5 is a section taken on the line 5—5 in Fig. 4, and showing the means for adjusting the mold cap horizontally; Fig. 6 is a front elevation of a portion of the machine frame, showing the mold-adjusting lever and sector in relation to the adjacent parts; Fig. 7 is a plan detail view of the lever and the means for holding it in adjusted position; Fig. 8 is a detached perspective view of the mold in the ejecting position, showing the spring block retracted, and the ejection of the slug from the mold and its passage between the trimming knives; Fig. 9 is an enlarged view of some of the parts illustrated in Fig. 1; and Fig. 10 is a detail sectional view taken on the line 10—10 of Fig. 2.

Referring to the drawings, the mold is connected to the front of the mold slide B by the rear horizontal stud or journal $c^{25}$, in such manner that it may be rocked to and fro about it in the manner well known in the art. The slide B moves backward and forward, carrying the mold with it, so that the latter may be moved in the customary manner to the casting and ejecting positions respectively. Fig. 1 shows the mold in its casting position, and in engagement with the composed line of matrices, at which time the pot-mouth $P^{10}$ presses against the rear of the mold.

As in my previous Patent No. 837,837, the mold comprises a body portion A, the relatively movable frame C, and the mold cap D, slidably seated in grooved ways in the frame. The general form of the mold frame and mold body is illustrated in Figs. 4$^a$ and 4$^b$, respectively, the parts being assembled in the manner shown in the other figures of the drawing, and so that the relative movements of the two members may be guided and controlled in the manner to be subsequently described. The mold cell E is formed at the top and bottom by the adjacent cap and body surfaces, at one end by the hardened metal block $c$, inserted in and made a part of the frame C, and at the other end by the projecting toe $f$ of the retractable spring block F. This spring block, shown in Fig. 4, in dotted lines in Fig. 2, and in section in Fig. 3, consists of a metal plate angularly shaped in cross-section, and having a square toe $f$ projecting from one of its corners. The block F slides vertically on the rear face of the mold cap D, and normally because of the engaging spring $f^1$, the toe $f$ projects below the lower face of the cap D into the mold slot E, and bears throughout its length upon the upper face of the mold body A. As the mold body A may be relatively moved with reference to the frame C and the cap D, it will be obvious that changes in the body measure or thickness of the slug may be effected by varying these relations.

Referring to Figs. 1, 2 and 9, it will be seen that a nut $c^1$ is mounted rigidly upon the frame C below the mold body A, and that a bushing $a^3$ is threaded within the nut $c^1$, and a gear sleeve $a^4$ in turn is threaded within the bushing $a^3$. The bushing $a^3$, when screwed into the nut $c^1$, is held in any desired position by means of the set-screw $a^6$. These adjusting and securing means are employed for the purpose of effecting permanent or corrective variations in the relations of the parts, and are not commonly used in connection with ordinary adjustments. The gear sleeve $a^4$ is provided at its upper end with a bevel gear, and at its lower end with a head $a^{20}$, and between the bevel gear and the head it is threaded into the bushing $a^3$. The rod $a$ passes through the center of the sleeve $a^4$, and also through the adjacent portion of the mold body A, and is secured against longitudinal movement by means of the head $a^1$ formed on one end thereof, and the collar $a^5$ located near the other end. The head $a^1$ of the rod is formed with a recess or opening to receive the T-shaped key $a^2$, which may be moved therein so as to bring its head either into engagement with the recess $a^{21}$ in the head $a^{20}$ of the sleeve $a^4$, or into the recess $c^{22}$ of the nut $c^1$. In the latter position, the key $a^2$ holds the rod from rotation with the sleeve $a^4$, whereas, in the former position the rod rotates with the sleeve, these two connections being used for the adjustment of the mold slot and the keeper-plate respectively, as will hereafter appear.

When the key $a^2$ is in engagement with the nut $c^1$, and because of the arrangement of the parts as previously described, the rotation of the gear sleeve $a^4$, because of its threaded connection with the nut $c^1$, causes a relative movement of the mold body A and frame C, and thus a change in the vertical dimensions of the mold cell, the width of the latter being decreased or enlarged according to the direction of rotation of the gear sleeve. At this time the rod $a$, because of its locked condition is not effective in adjusting the keeper-plate, which feature will be subsequently described.

Upon the front of the machine, and within easy reach of the operator seated at the keyboard, as shown in Figs. 1, 6 and 7, is arranged the hand lever H, by means of which the mold cell adjustments for body measure are controlled. This lever is hinged at the point $h^2$ to a casting $h^3$, the latter being secured to the horizontal shaft $h$ by the adjustable nut $h^1$. The shaft $h$ is carried or supported in the bracket $h^{10}$, which is also formed or recessed to receive the spiral spring $h^9$, the shaft $h$ being shouldered to engage the spring. On the inner end of the shaft $h$ is secured the bevel gear $a^8$, which automatically meshes with the corresponding bevel gear on the sleeve $a^4$ when the mold moves forward either in the casting or in the ejecting position, the proper engagement of these gears being assisted by the pressure of the spring $h^9$ and the longitudinal movement of the shaft $h$ being limited by its connection to the adjustable nut $h^1$. The forward motion of the mold referred to is that which occurs in the normal operation of a linotype machine, such as when the mold advances to engage the assembled line of matrices in the casting position, as disclosed for instance in United States Letters Patent No. 436,531, and as illustrated in Fig. 1 of the drawings herein. The adjustments effected through the rotation of the shaft $h$ are effected at the time of the automatic engagements of the gears just mentioned, the shaft being actuated for this purpose in the manner now to be described. A graduated disk $h^5$ is secured on the front end of the bracket $h^{10}$, and is provided on its periphery with locating pins $h^6$, so arranged as to enter a notch in the plate $h^7$ of the lever H, (see Fig. 7), and thus to hold the lever in any desired position. A coil spring $h^4$ located between the end of the lever H and the casting $h^3$ acts to maintain the engagement of the lever with any selected one of the locating pins $h^6$. When the operator wishes to change the body measure of the mold slot, that is to say, the thickness of the slug, he grasps the handle of the lever H and moves it forward to the position shown in dotted lines in Fig. 1. In this way it is disengaged from the locking pin and may be moved to any other desired point on the graduated disk $h^5$, when it is allowed to engage a pin $h^6$ in its new position. It will be apparent that this movement of the hand lever, through the engagement of the gear $a^8$ with the gear on the sleeve $a^4$, causes the rotation of the latter and thus changes the body size of the mold cell in the manner previously described.

Turning now to the means whereby adjustments are effected in the length of the mold cell, or in other words, in the line measure, and referring to Figs. 1, 2, 3, 4 and 8, it will be seen that the mold cap D slides in grooved ways across the upper portion of the frame C, and is retained in position thereon by gibs or other suitable fastenings. Upon the mold cap D is carried the spring block F, the projecting toe $f$ of which extends across the mold slot and forms one end of the cell. It is retained in its position upon the cap D in the manner shown in Figs. 3 and 4,—the toe $f$ lying within a slot or recess across the lower face of the cap, and the retaining clip $d^{16}$ serving to hold it against the rear face of the cap in such manner that it cannot be disengaged therefrom. Two springs, $f^1$ and $d^{17}$, which bear respectively upon the toe and upon the inclined edge of the block, constantly urge it downward and serve to maintain its alinement. It will be obvious that changes in the position of the mold cap D with relation to the supporting frame C will effect corresponding changes in the length of the mold cell, and this adjustment is accurately controlled in the manner now to be described.

Referring to Figs. 4 and 5, a toothed rack $d$ is fastened to the rear face of the mold cap D, its teeth meshing with the teeth of the pinion $d^1$, which is secured to the rear end of a bearing stud $d^2$, which passes through the frame C and is formed on its face with a squared recess $d^3$. This recess may be engaged by a key $d^4$, shown in dotted lines in Fig. 5, and the pinion rotated so as to move the mold cap in one direction or the other, when it is desired to change the line measure. In order to facilitate the adjustment, graduated scales, not shown, may be placed in appropriate positions upon the frame C, or upon the mold cap D, or both, in the manner well understood in the art. After the line adjustment of the mold cap is made, it is necessary that it should be locked in adjusted position, so that the pressure of the metal during the casting, or the movements of the mold itself, may not disturb the adjustment. I therefore employ a second detent rack $d^5$, which is accurately graduated in any desired manner and which is fastened behind the gear rack $d$ to the rear face of the mold cap D. The detent teeth of the rack $d^5$ are engaged by a locking tooth $d^{11}$, formed on the plate $d^6$, which in turn is secured to the slide block $d^{12}$, carried on the lever $d^7$.

The lever $d^7$ is pivoted on the rear face of the frame C at $d^8$, and is constantly urged downward by the spring $d^9$. The slide block $d^{12}$, to which the plate $d^6$ and locking tooth $d^{11}$ are attached, may be adjusted accurately in position by the finely threaded rod $d^{14}$ and the finger nut $d^{13}$, a spring $d^{15}$ bearing against the nut $d^{13}$ to hold the latter against accidental turning. Before changing the adjustment of the line measure of the mold slot, the locking tooth $d^{11}$ must be first disengaged from the rack $d^5$, and this is effected by moving the lever $d^7$, as shown in dotted lines in Fig. 4, after which the detent finger $d^{10}$ (see Figs. 2 and 4) is turned so as to rest on the frame C, as shown by dotted lines in Fig. 4, and thus maintain the lever in its disengaged position against the tension of the spring $d^9$ until the mold cap has been moved by the operator to the desired position.

It will be seen that the adjustment of the mold for length of line, like its adjustment for the thickness of the slug, may be made by the operator from his position at the keyboard without leaving his seat or opening the vise, this feature being a valuable and important characteristic of the construction.

The mold frame may be rocked about its pivot stud $c^{25}$ in any desired manner, in order to move the mold from the ejecting to the casting position, or vice versa, but I prefer to use the particular form of connection shown in Fig. 2, which consists of the crank I secured to the shaft $i$, and connected by means of the link J to the point $j$ of the mold frame. The crank I in this construction takes the place of the pinion gear usually provided in machines of this class, and may be similarly operated by means of any suitable connections from the driving mechanism. However, the particular form employed constitutes no part of the present invention.

The spring block F is operated from time to time transversely of the mold cap D, to withdraw the projecting toe $f$ from the mold slot E, thus leaving the mold slot open throughout its entire length between the cap D and the body A, to permit the passage therethrough of a full width ejector blade. In this manner, I obviate the necessity for a change of ejector blades when the line measure is altered, a single blade of full width being efficiently employed for ejecting purposes, notwithstanding the size of the slugs produced in the mold. This withdrawal of the projecting toe $f$ from the mold takes place after each casting operation and during the movement of the mold to the ejecting position. Referring to Figs. 2, 3, 4 and 8, a lever $d^{18}$ is pivoted to the mold cap D at $d^{19}$, and carries at its free end the cam roll $d^{20}$. The lever $d^{18}$ lies normally beneath the stud $f^2$, which projects from the spring block F. As the mold frame swings through a quarter turn to the ejecting position, the cam roll $d^{20}$ contacts with and overrides the stationary cam surface $d^{21}$ secured to the frame of the machine, the resulting movements of the lever and spring block being shown in dotted lines in Fig. 2, and in perspective in Fig. 8. As will be seen in the last mentioned figure, the full width ejector blade K advances through the mold slot and expels the slug L therefrom, and at the same time causes it to pass between the trimming knives $L^1$. The ejector blade is then retracted and the return movement of the mold frame permits the return of the lever $d^{18}$ and the spring block F to their normal positions.

As shown in Fig. 2, I have provided the ordinary registering pins or dowels $a^9$ and $a^{10}$ as a means for accurately alining the mold when in the casting position. I also provide an additional means to steady it in the ejecting position. Referring to Fig. 1, immediately below the bracket $h^{10}$, I pivot a lever $h^{12}$ between lugs $h^{11}$ depending from the bracket $h^{10}$, the longer end of the lever $h^{12}$ extending toward the front of the machine and resting upon a stiff coil spring $h^{14}$ contained in a suitable recess in the bracket casting. The opposite and shorter end of the lever $h^{12}$ projects toward the rear of the machine (see Fig. 8), where it is beveled and rides upon a plate of hardened metal $a^{11}$, set upon one of the faces of the mold body A, when the mold advances in its ejecting position. By these means the mold, mold frame, and the connected parts are properly registered and held steadily therein during the ejecting operation. I have also provided means whereby the position of the first elevator M and the mold keeper-plate N may be varied either separately or simultaneously with reference to the mold slot E, and to any desired extent for the purpose of altering the position of the characters upon the slug in the manner previously discussed.

Referring to Figs. 1, 2 and 9, it will be seen that the first elevator frame $m$ is formed with a lug or projection $m^1$, provided with the set-screw $m^2$, which engages with the cam or eccentric $h^{15}$ located beneath the screw and sustaining it. This cam or eccentric $h^{15}$ rotates upon a bearing formed in the bracket casting $h^{10}$, and is secured to the operating sleeve or plate $h^{16}$, the upper end of which is extended forward and provided with the spring-actuated latch $h^{17}$. The hand lever H, previously described, has a pin $h^{18}$, which may be engaged by the operator at will between the projecting portion of the plate $h^{16}$ and the latch $h^{17}$, so that as he moves the lever from one point to another upon the graduated disk previously described, the plate $h^{16}$ is carried along with the lever, and as the cam or eccentric $h^{15}$ is rotated thereby the height of the first elevator with reference to the mold slot is varied accordingly.

As shown in Figs. 1, 2 and 9, the mold keeper-plate N is grooved horizontally along the upper portion of its face in the customary way to engage, aline and retain the lower ears of the matrices in the composed line. It is formed with two depending lugs $n$, $n$, which are pivoted at $n^1$, $n^1$, to the slide block $n^2$, which slide block contains and engages the nut $n^5$, into which the upper end of the rod $a$ is threaded. The slide block $n^2$ is also formed with guiding pins $n^6$, $n^6$, which enter suitable recesses in the mold body and guide and aline the slide block during its reciprocation. The keeper-plate N is normally forced outwardly by the spring $n^3$ contained in a suitable recess in the mold body, the extent of this outward movement being limited by the adjusting screw $n^4$.

As previously described, when the head of the key $a^2$ engages in the recess $c^{22}$ of the nut $c^1$, the rotation of the gear sleeve $a^4$ causes the relative movement of the frame C and the mold body A, and thus varies the width of the mold slot E. Due to the connection of the keeper-plate N to the mold body A, it remains in fixed relation thereto at this time and is therefore independent of alterations in the width of the mold slot. The keeper-plate N is, however, also adjustable independently of the mold body, and this feature will now be described.

The rod $a$ is employed for the purposes of this independent adjustment of the keeper-plate N, and the necessary connection is effected by manually or otherwise moving the key $a^2$ inwardly, thus bringing its head into the recess $a^{21}$ formed in the head $a^{20}$ of the gear sleeve $a^4$. This movement disconnects the rod $a$ from its fixed position with relation to the nut $c^1$, and connects it instead to the gear sleeve $a^4$, so that the rod and sleeve now turn as one member. In this position of the parts, the movement of the hand lever H, transmitted through the bevel gear $a^8$ to the gear sleeve $a^4$, causes the rotation of the rod $a$, and through the nut $n^5$ and slide block $n^2$ thus effects the independent vertical adjustment of the keeper-plate N with reference to the mold body. It will be evident that the movement of the hand lever H may be communicated simultaneously to two different devices in the machine,—to the first elevator through the eccentric or cam $h^{15}$, and to the keeper-plate N through the rod $a$, etc. In each case the heights of the respective parts are varied correspondingly and synchronously. Moreover, this simultaneous adjustment is also effected from the front of the machine and made by the operator from his position at the keyboard, whenever it is necessary for any reason to vary the relations of the mold slot with the first elevator and keeper-plate. It may also be employed for all changes of body measure whenever the matrices, of whatever body or face, have been made in the first instance to some common standard of alinement. For instance, assuming that the standard has been taken, at 14-point, which position of the plate $h^{16}$ is shown in dotted lines on the disk in Fig. 6, the coöperating alinement devices ought always to be engaged by or disengaged from the hand lever H at this position. That is to say, when it is desired to throw the device out of operation, the lever H should be moved to the 14-point mark upon the graduated disk before disengaging it from the plate $h^{16}$, and before changing the location of the T-key $a^2$, so as again to connect the rod $a$ with the nut $c^1$. Conversely, whenever it is required to bring the device into operation the lever H should be moved to the same mark before the reverse connections are made. This is the proper and orderly course to be pursued to secure the correct adjustment of the keeper-plate with that of the first elevator. When, however, through the carelessness of the operator, or otherwise, the respective adjustments do not properly coincide, the pivoted and spring-pressed construction of the keeper-plate N permits it to yield as the mold advances to the composed line, and the ears of the matrices are not sheared off or mutilated, as might occur if presented in an improper position, and such precautionary means were not employed.

As shown in Fig. 2, the springs O and P are employed between the mold body A and the frame C, in order to maintain the balance of the parts during their periods of movement and adjustment, and to secure their correct engagement and relative adjustment under all conditions. I have, however, provided additional means to insure the accurate position of the parts, and particularly the exact parallelism of the upper and lower walls of the mold slot E, if, for any reason, this essential parallelism should be disturbed.

Referring to Figs. 2, 4$^a$, 4$^b$, and 10, the frame C is shown as formed with a lug $c^2$ at one corner thereof. The mold body A is correspondingly formed with a socket $a^{12}$, having parallel twin extensions. A stud $a^{13}$ is secured at one end in the lug $c^2$, and projects therefrom, the projecting portion being eccentrically shouldered, the said eccentric portion engaging between the parallel faces of the socket $a^{12}$. It will be apparent that the turning or rotary adjustment of the stud $a^{13}$ due to the engagement of its eccentric portion with the socket $a^{12}$, alters the relative positions of the frame C and body A, and that thereby the parallelism of the faces of the mold cell n may be accurately adjusted and alined, if it be found necessary.

Generally speaking, among the essential advantages secured by my construction are the following: The adjustment and readjustment of the mold parts to produce different measures of length or body, or both, may be conveniently and speedily effected by the operator from his position at the keyboard, and without disturbing or altering the normal organization of the machine; the adjustable mold is provided with a movable block or abutment, forming one wall of the mold cell, which is withdrawn automatically during the ejecting operation, the abutment thus subserving a double function; a single ejector blade of full width is employed, notwithstanding variations in the size of the slug; the matrix alining devices may be adjusted either simultaneously with the adjustment of the mold, or independently thereof; the matrix alining devices and the matrix presenting means may be similarly adjusted with reference to the mold slot, either separately or simultaneously; these last mentioned adjustments are also effected by the operator from his position at the keyboard and without disturbing the normal condition and organization of the machine; and special means are also provided for insuring, adjusting and maintaining the parallelism of the mold walls.

Having thus described my invention, its construction and mode of operation, what I claim and desire to secure by Letters Patent of the United States is as follows:

1. In a linotype machine, a slotted mold, one of the walls of which is adjustable to different points to vary the size of the slot and is also retractable transversely to permit the passage of the ejector blade together with means to retract the wall for the purpose specified.

2. In a linotype machine, a slotted mold, one of the walls of which is movable in two directions, longitudinally to vary the length of the slot, and transversely to permit the passage of the ejector blade together with means to move the wall transversely for the purpose specified.

3. In a linotype machine, a slotted mold, comprising a wall which is adjustable to different points to vary the size of the slot and also retractable transversely to permit the passage of the ejector blade, the said wall being spring actuated to hold it in normal position together with means to retract the wall for the purpose specified.

4. In a linotype machine, a slotted mold movable from the casting to the ejecting position, one of the walls of which is adjustable to different points to vary the size of the slot and also retractable transversely to permit the passage of the ejector blade, together with means whereby the said wall is retracted during the passage of the mold from the casting to the ejecting position.

5. In a linotype machine, a slotted mold movable from the casting to the ejecting position, one of the walls of which is adjustable to different points to vary the length of the slot and also retractable transversely to permit the passage of the ejector blade, the said wall being spring actuated to hold it in its normal place, together with means whereby the wall is retracted during the passage of the mold from the casting to the ejecting position and permitted to resume its normal place during its passage from the ejecting to the casting position.

6. In a linotype machine, a slotted mold provided with a movable part whereby the size of the slot may be varied, combined with a single manual operating device mounted upon the fixed frame and automatically engaging connections therefrom to the movable mold part adapted upon the actuation of the operating device to effect simultaneously any desired change in the size of the slot.

7. In a linotype machine, a slotted mold provided with a movable part whereby the width of the slot may be varied, combined with a single manual operating device mounted upon the fixed frame and automatically engaging connections therefrom to the movable mold part adapted upon the actuation of the operating device to effect simultaneously any desired change in the width of the slot.

8. In a linotype machine, the combination of a mold and a mold keeper to aline the matrices in engagement therewith, with adjusting means to vary the relative position of the keeper to the mold, and operating devices connected to the adjusting means and located at the outside of the machine.

9. In a linotype machine, the combination of a mold and mechanism for presenting the matrices thereto, with adjusting means for the said presenting mechanism, whereby the relative positions of the mold and the presenting mechanism may be varied, together with operating devices connected to the said adjusting means and located on the fixed frame of the machine.

10. In a linotype machine, a slotted mold provided with adjusting means whereby the width of the slot may be varied and a single manual operating device mounted upon the fixed frame and automatically connecting with the adjusting means, the said operating device being located in convenient position so that the operator may effect any desired adjustment at will and without disturbing the organization of the machine.

11. In a linotype machine, the combination of a mold and a mold keeper to aline the matrices in engagement therewith, with adjusting means to vary the relative position of the keeper to the mold, and operating devices connected to the adjusting means and located in proximity to the keyboard, so that the operator may effect the adjustment without leaving his place or disturbing the organization of the machine.

12. In a linotype machine, the combination of a mold and mechanism for presenting the matrices thereto, with adjusting means for the said presenting mechanism, whereby the relative positions of the mold and the presenting mechanism may be varied, together with operating devices connected to the said adjusting means and located in proximity to the keyboard, so that the operator may effect the adjustment without leaving his place or disturbing the organization of the machine.

13. In a linotype machine, a rotary mold frame and a slotted mold contained therein, with adjusting means to vary the size of the slot, together with operating connections for the said adjusting means, which connections are located concentrically with reference to the rotary mold frame.

14. In a linotype machine, the combination of a rotary mold frame, and a mold and a mold keeper mounted therein, with adjusting means to vary the relative positions of the mold and the mold keeper, and operating connections for the adjusting means, which connections are located concentrically with reference to the rotary mold frame.

15. In a linotype machine, the combination of a movable mold frame and a mold contained therein, with adjusting means to vary the size of the mold, and a single manual operating device automatically connecting with said adjusting means and located on a portion of the fixed frame, whereby any desired variation in the size of the mold may be effected at will.

16. In a linotype machine, the combination of a movable mold frame, and a mold and a mold keeper mounted therein, with adjusting means to vary the relative positions of the mold and the mold keeper, and operating devices connected to said adjusting means and located on a portion of the fixed frame.

17. In a linotype machine, a sectional mold frame and a mold contained therein, the said mold comprising two parallel mold walls located on different sections of the frame, together with adjusting means between the said frame portions to control their angular relation, whereby the parallelism of the walls may be insured.

18. In a linotype machine, a sectional mold frame and a mold contained therein, the said mold comprising two parallel mold walls located on different sections of the frame, together with an eccentric interposed between the said frame portions to control their angular relation, whereby the parallelism of the walls may be insured.

19. In a linotype machine, a sectional mold frame and a mold contained therein, the said mold comprising two parallel mold walls located on different sections of the frame, together with springs acting upon the said frame sections and tending to hold them in proper angular relation.

20. In a linotype machine, a sectional mold frame and a mold contained therein, the said mold comprising two parallel mold walls located on different sections of the frame, springs acting upon the said frame portions and tending to hold them in proper angular relation, together with adjusting means interposed between the said frame portions to control their angular relation, whereby the parallelism of the walls may be insured.

21. In a linotype machine, the combination of a slotted mold and a mold-keeper connected thereto, with a screw interposed between the mold and mold-keeper whereby their relative positions may be varied at will, and a manual operating device connected to the screw.

22. In a linotype machine, the combination of an adjustable mold and a mold keeper connected thereto, with a single adjusting means, comprising shiftable connections, whereby their relative positions may be varied or whereby the mold may be adjusted alone, at will.

23. In a linotype machine, the combination of a mold and a mold keeper connected thereto, with a single adjusting means whereby their relative positions may be varied or whereby the mold may be adjusted alone, at will.

24. In a linotype machine, the combination of a mold and a mold keeper connected thereto, with a single adjusting means whereby their relative positions may be varied or whereby the mold may be adjusted alone, at will, together with operating devices connected to the said adjusting means and located at the outside of the machine.

25. In a linotype machine, the combination of a mold and a mold keeper connected thereto, with a single adjusting means, the said adjusting means comprising a connecting device whereby their relative positions may be varied or whereby the mold may be adjusted alone, at will.

26. In a linotype machine, the combination of a mold, a mold keeper, and mechanism for sustaining and presenting the matrices thereto, together with adjusting means whereby the mold keeper and the presenting mechanism may be adjusted together.

27. In a linotype machine, the combination of a mold, a mold keeper, and mechanism for sustaining and presenting the matrices thereto, with adjusting means whereby the mold keeper and the presenting mechanism may be adjusted in unison, together with devices connected to the adjusting means and located at the outside of the machine.

28. In a linotype machine, the combination of an adjustable mold, an adjustable mold keeper, and an adjustable matrix presenting mechanism, with a single operating device therefor comprising shiftable connections, whereby one or more of the said parts may be adjusted in unison.

29. In a linotype machine, the combination of an adjustable mold, an adjustable mold keeper, and an adjustable matrix presenting mechanism, with a single operating device therefor comprising shiftable connections, whereby one or more of the said parts may be adjusted in unison, the said operating device being located at the outside of the machine.

30. In a linotype machine, an adjustable slotted mold comprising a movable member and adjusting means therefor to vary the length of the slot, together with a detent and detent-rack connected with the movable member to lock it in adjusted position.

31. In a linotype machine, an adjustable slotted mold comprising adjusting means to vary the length of the slot and separate and distinct means coöperating directly with the mold to lock the parts in adjusted position, the said locking means being also provided with adjusting devices.

32. In a linotype machine, an adjustable slotted mold comprising adjusting means to vary the length of the slot and separate and distinct means coöperating directly with the mold to lock the parts in adjusted position, together with a device to hold the locking means out of operative position during the adjustment of the parts.

33. In a linotype machine, the combination of a mold and matrix presenting means, with a mold keeper arranged to yield in the event of the improper presentation of the matrices.

34. In a linotype machine, the combination of a mold and matrix presenting means, with a pivotally-mounted and spring-pressed mold keeper, so that it may yield in the event of the improper presentation of the matrices.

35. In a linotype machine, the combination of a movable mold frame and ejecting mechanism, with a steadying and alining device pivotally-mounted to coöperate with the mold frame in its ejecting position.

In testimony whereof I have affixed my signature in presence of two witnesses.

THOMAS SIMMONS HOMANS.

Witnesses:
JOHN F. STEVENS,
CHARLES E. GRANT.